United States Patent
Hoshinoya et al.

(10) Patent No.: US 11,489,415 B2
(45) Date of Patent: Nov. 1, 2022

(54) DRIVE UNIT

(71) Applicant: HONDA MOTOR CO., LTD., Tokyo (JP)

(72) Inventors: Takeshi Hoshinoya, Saitama (JP); Heisuke Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 16/919,295

(22) Filed: Jul. 2, 2020

(65) Prior Publication Data
US 2021/0006137 A1 Jan. 7, 2021

(30) Foreign Application Priority Data
Jul. 2, 2019 (JP) .............................. JP2019-123963

(51) Int. Cl.
*H02K 11/33* (2016.01)
*H02K 5/22* (2006.01)
(Continued)

(52) U.S. Cl.
CPC .............. *H02K 11/33* (2016.01); *H02K 5/20* (2013.01); *H02K 5/22* (2013.01); *H02K 5/225* (2013.01); *H02K 9/19* (2013.01); *B60K 6/405* (2013.01)

(58) Field of Classification Search
CPC . B60K 6/405; B60K 1/00; B60K 1/04; B60K 2001/001; B60K 2001/006;
(Continued)

(56) References Cited

U.S. PATENT DOCUMENTS

| 8,929,079 B2* | 1/2015 | Watanabe | H05K 7/20854 |
| | | | 361/705 |
| 2005/0167183 A1* | 8/2005 | Tominaga | H02K 11/33 |
| | | | 180/444 |

(Continued)

FOREIGN PATENT DOCUMENTS

| CN | 109861559 A | 6/2019 |
| JP | H07-131951 A | 5/1995 |

(Continued)

OTHER PUBLICATIONS

May 18, 2021, Japanese Office Action issued for related JP Application No. 2019-123963.

*Primary Examiner* — Alexander A Singh
(74) *Attorney, Agent, or Firm* — Paratus Law Group, PLLC

(57) ABSTRACT

A drive unit includes: a rotating electric machine having a rotation axis extending in a horizontal direction; a rotating electric machine case; and a power conversion device. The power conversion device is arranged on one side of the rotating electric machine in an orthogonal direction. The power conversion device includes a first connector to which a first electric power line through which electric power supplied to the rotating electric machine and electric power supplied from the rotating electric machine flow are connected. The first connector is provided on a first end side and is arranged to protrude from the power conversion device at a predetermined angle in a direction away from the rotating electric machine in the orthogonal direction, as the first connector goes away from the power conversion device in the rotation axis direction, when viewed from above.

5 Claims, 8 Drawing Sheets

(51) Int. Cl.
*H02K 9/19* (2006.01)
*H02K 5/20* (2006.01)
*B60K 6/405* (2007.10)

(58) Field of Classification Search
CPC .. B60K 2001/0438; H02K 5/225; H02K 9/19; H02K 5/20; H02K 5/203; H02K 11/33; H02K 11/00; H02K 11/30; H02K 11/38; H02K 5/22; H02K 9/00; H02K 9/193; H02K 9/197; B60Y 2200/92
USPC .... 310/71, 68 R, 68 D, 52, 53, 54, 58, 60 A
See application file for complete search history.

(56) References Cited

U.S. PATENT DOCUMENTS

| | | |
|---|---|---|
| 2009/0010787 A1 | 1/2009 | Nakazawa et al. |
| 2013/0278090 A1* | 10/2013 | Matsuo .................. H02K 5/203 310/54 |
| 2015/0061423 A1 | 3/2015 | Nagao et al. |
| 2016/0126808 A1* | 5/2016 | Nagao .................... H02K 11/33 310/54 |
| 2017/0063203 A1 | 3/2017 | Doo |
| 2018/0022202 A1 | 1/2018 | Urabe et al. |
| 2018/0262089 A1 | 9/2018 | Hatch |
| 2018/0304835 A1* | 10/2018 | Skalski ................... H02K 5/10 |
| 2019/0162181 A1 | 5/2019 | Yamaguchi et al. |
| 2019/0170140 A1 | 6/2019 | Yamaguchi |
| 2019/0173343 A1 | 6/2019 | Yamaguchi |
| 2019/0173344 A1 | 6/2019 | Ishikawa et al. |
| 2019/0173352 A1 | 6/2019 | Yamaguchi et al. |
| 2019/0173358 A1 | 6/2019 | Ishikawa et al. |
| 2019/0173359 A1 | 6/2019 | Ishikawa et al. |
| 2019/0178365 A1 | 6/2019 | Ishikawa et al. |
| 2019/0181720 A1 | 6/2019 | Yamaguchi et al. |
| 2019/0181723 A1 | 6/2019 | Yamaguchi |
| 2019/0181724 A1 | 6/2019 | Nakamatsu et al. |
| 2019/0186622 A1 | 6/2019 | Ishikawa et al. |
| 2019/0207478 A1 | 7/2019 | Yamaguchi et al. |
| 2019/0207479 A1 | 7/2019 | Yamaguchi et al. |
| 2019/0207480 A1 | 7/2019 | Yamaguchi |
| 2019/0207481 A1 | 7/2019 | Yamaguchi et al. |
| 2019/0219052 A1 | 7/2019 | Yamaguchi et al. |
| 2020/0007009 A1 | 1/2020 | Migita et al. |
| 2021/0083548 A1 | 3/2021 | Yamaguchi et al. |

FOREIGN PATENT DOCUMENTS

| | | |
|---|---|---|
| JP | 2009-013878 A | 1/2009 |
| JP | 2015-053773 A | 3/2015 |
| WO | WO 2016/121032 A1 | 8/2016 |
| WO | WO 2018/030323 A1 | 2/2018 |

\* cited by examiner

DRIVE UNIT

CROSS-REFERENCE TO RELATED APPLICATIONS

The present application claims the benefit of priority of Japanese Patent Application No. 2019-123963, filed on Jul. 2, 2019, the content of which is incorporated herein by reference.

TECHNICAL FIELD

The present invention relates to a drive unit mounted on an electric vehicle or the like.

BACKGROUND ART

Vehicles such as hybrid vehicles and electric vehicles which use a rotating electric machine as a drive source are known. In such a vehicle, a power conversion device which is electrically connected to a rotating electric machine and which converts electric power supplied to the rotating electric machine and electric power supplied from the rotating electric machine is mounted together with the rotating electric machine. The rotating electric machine and the power conversion device were electrically connected using a three-phase wire, but in recent years, it has been attempted to directly fix the rotating electric machine and the power conversion device into a unit.

For example, International Publication No. 2016-121032 proposes, as a drive unit, to directly fix a power conversion device above a rotating electric machine. However, with the configuration described in International Publication No. 2016-121032, the height dimension of the drive unit becomes large, and thus the degree of freedom in layout decreases. U.S. Patent Application Publication No. 2018-0262089 proposes, as a drive unit, directly fixing a power conversion device to one side of a rotating electric machine in an orthogonal direction orthogonal to both a rotation axis direction and an up-down direction.

The power conversion device of the drive unit is connected to a power line through which electric power supplied to the rotating electric machine and electric power supplied from the rotating electric machine flow. However, in the case of a drive unit in which the power conversion device is fixed to one side of the rotating electric machine in the orthogonal direction orthogonal to both the rotation axis direction and the up-down direction as in U.S. Patent Application Publication No. 2018-0262089, the rotating electric machine is located adjacent thereto in the orthogonal direction. Therefore, when connecting or disconnecting the power conversion device and the power line, a work space in the orthogonal direction becomes small, and thus there is a problem in maintainability.

SUMMARY

The present invention provides a drive unit with improved maintainability.

According to an aspect of the invention, there is provide a drive unit including: a rotating electric machine having a rotation axis extending in a horizontal direction; a rotating electric machine case including a rotating electric machine accommodation portion for accommodating the rotating electric machine; and a power conversion device electrically connected to the rotating electric machine and configured to convert electric power supplied to the rotating electric machine and electric power supplied from the rotating electric machine, in which; the power conversion device is arranged on one side of the rotating electric machine in an orthogonal direction orthogonal to both the rotation axis direction and an up-down direction; the power conversion device includes a first end and a second end in the rotation axis direction, and a first connector to which a first electric power line through which electric power supplied to the rotating electric machine and electric power supplied from the rotating electric machine flow are connected; and the first connector is provided on the first end side and is arranged to protrude from the power conversion device at a predetermined angle in a direction away from the rotating electric machine in the orthogonal direction, as the first connector goes away from the power conversion device in the rotation axis direction, when viewed from above.

According to the invention, when viewed from above, the first connector is arranged to protrude from the power conversion device at the predetermined angle in the direction away from the rotating electric machine in the orthogonal direction as it goes away from the power conversion device in the rotation axis direction. Therefore, it is easy to secure a work space, and thus maintainability is improved.

DESCRIPTION OF EMBODIMENTS

Figure 1:
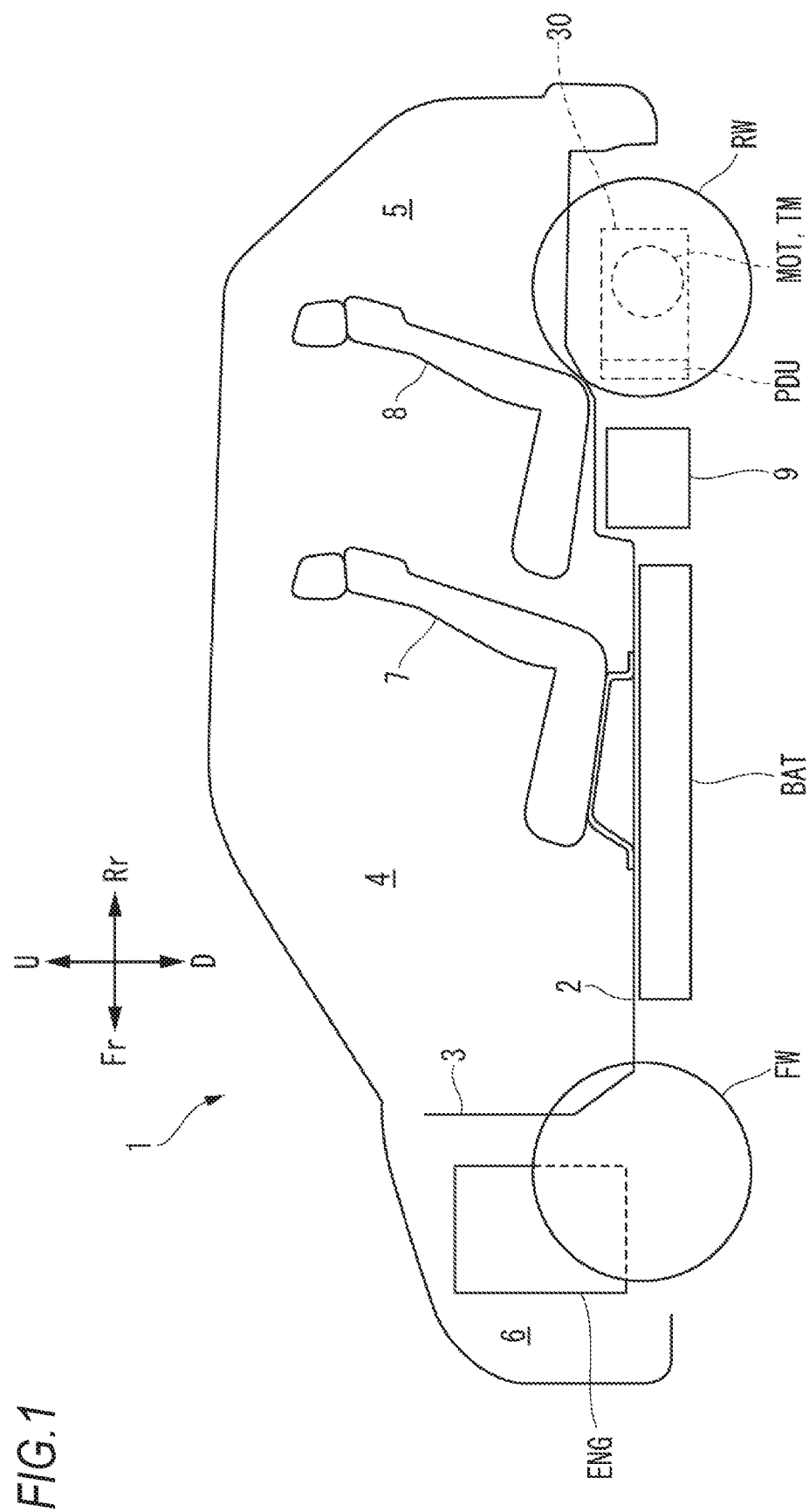
FIG. 1 is a schematic side view illustrating an overall structure of a vehicle in which a drive unit according to an embodiment of the invention can be mounted.

Hereinafter, a drive unit of an embodiment of the invention and a vehicle of an embodiment equipped with the drive unit will be described with reference to the drawings. In the following description, front-rear, left-right, and up-down are described according to the direction viewed from an operator of the vehicle. The drawing indicates the front of the vehicle as Fr, the rear as Rr, the left as L, the right as R, the upper as U, and the lower as D.

Figure 2:
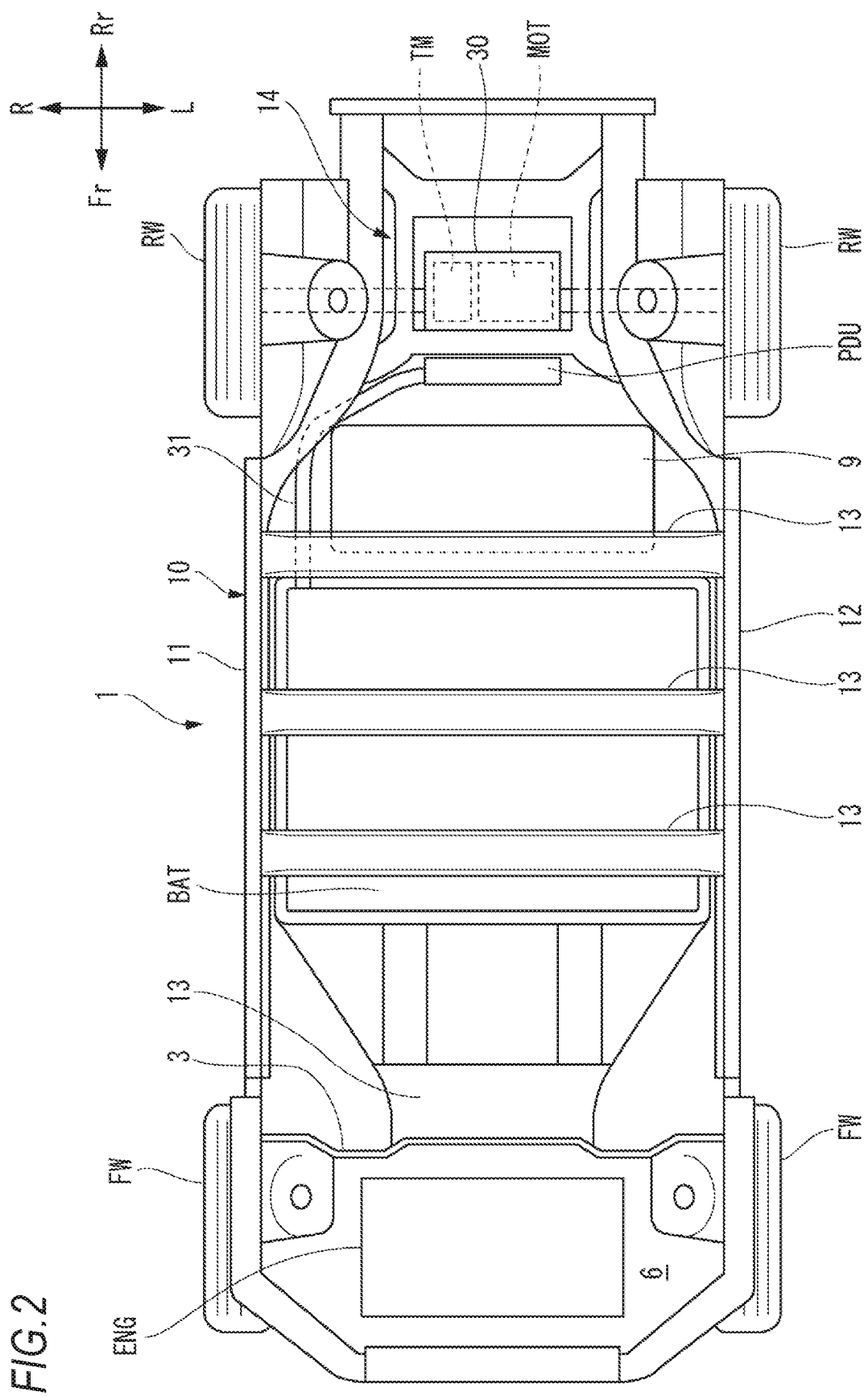
FIG. 2 is a plan view illustrating an underfloor structure of the vehicle in FIG. 1.

As illustrated in FIGS. 1 and 2, a vehicle 1 is partitioned by a floor panel 2 and a dash panel 3 into a passenger compartment 4, a luggage compartment 5 and a front room 6 in front of the compartment. The passenger compartment 4 is provided with a front seat 7 and a rear seat 8. The front room 6 is provided with an engine ENG as a drive source for driving left and right front wheels FW and a drive unit 30 accommodating an electric motor MOT as a drive source for driving left and right rear wheels RW is provided below the luggage compartment 5. That is, the vehicle 1 is a so-called hybrid vehicle which uses both the engine ENG and the electric motor MOT as drive sources.

Below the passenger compartment 4, a battery BAT and a fuel tank 9 are arranged. The battery BAT and the drive unit 30 are connected via a DC line 31 and the engine ENG and the fuel tank 9 are connected via a fuel pipe (not illustrated).

Figure 3:
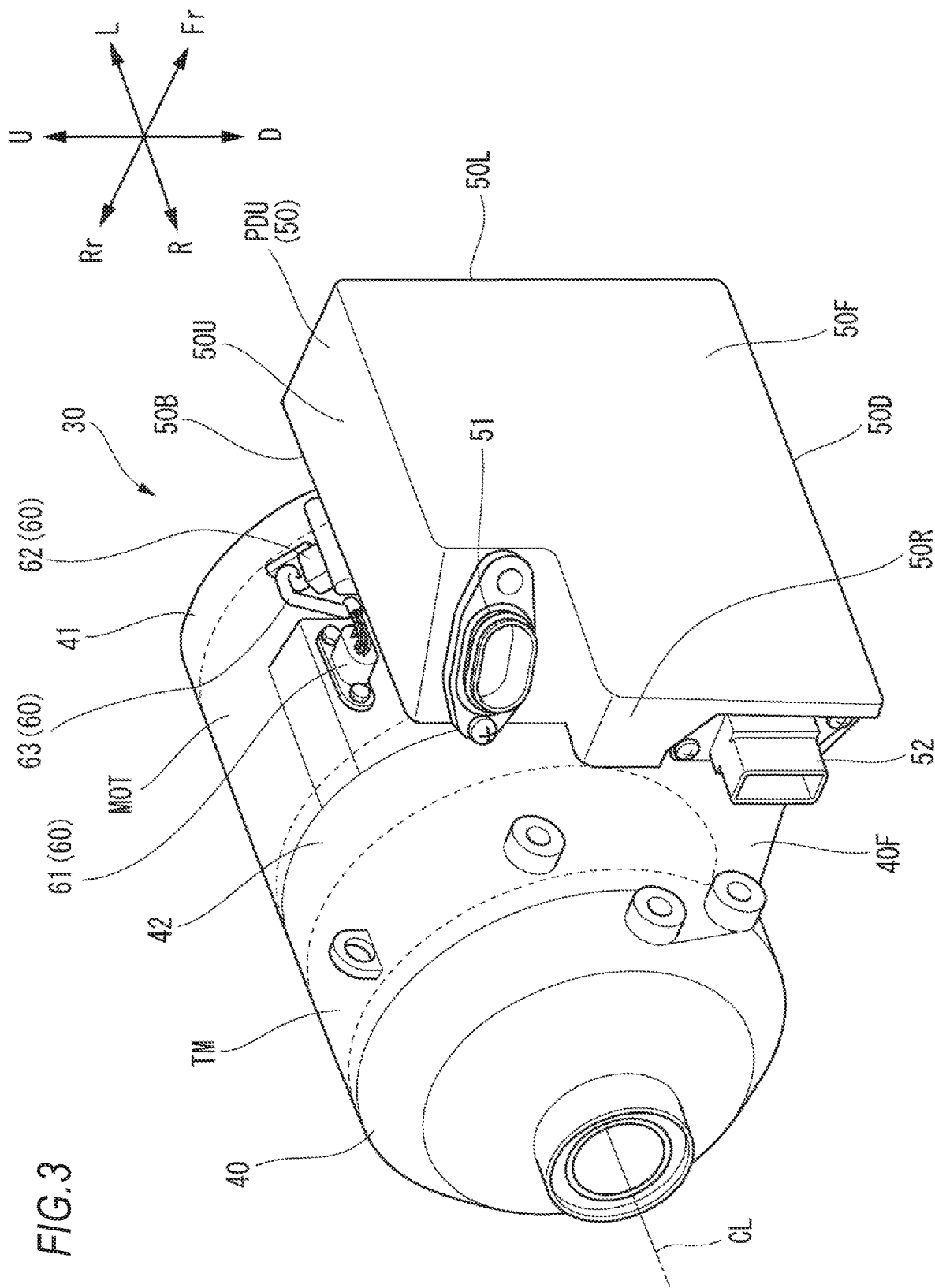
FIG. 3 is an overall perspective view of the drive unit according to the embodiment of the invention.

A vehicle body frame 10 includes a pair of left and right side frames 11 and 12 extending in a front-rear direction, a plurality of cross members 13 extending in a vehicle width direction (hereinafter also referred to as a left-right direction) and connecting the side frames 11 and 12, and a sub-frame 14 which supports the drive unit 30 and has a substantially rectangular shape in a plan view As illustrated in FIG. 3, the drive unit 30 includes the electric motor MOT, a power conversion device PDU which is electrically connected to the electric motor MOT and converts electric power supplied to the electric motor MOT and electric power supplied from the electric motor MOT, and a power transmission mechanism TM for transmitting the power of the electric motor MOT to the rear wheels RW. The power conversion device PDU is, for example, an inverter.

The electric motor MOT has a substantially cylindrical shape and a rotation axis CL extends to be substantially parallel to a vehicle width direction. The rotation axis CL is a rotation axis center of the electric motor MOT. The power transmission mechanism TM is arranged side by side with the electric motor MOT in the vehicle width direction such that the axis center of an output shaft is coaxial with the rotation axis CL of the electric motor MOT. In the embodiment, the electric motor MOT and the power transmission mechanism TM are arranged side by side in the vehicle width direction such that the electric motor MOT is on the left side and the power transmission mechanism TM is on the right side.

The electric motor MOT and the power transmission mechanism TM are accommodated in an electric motor case 40. The electric motor case 40 includes an electric motor accommodation portion 41 and a power transmission mechanism accommodation portion 42. The electric motor MOT is accommodated in the electric motor accommodation portion 41 and the power transmission mechanism TM is accommodated in the power transmission mechanism accommodation portion 42.

The power conversion device PDU is arranged adjacent to the front of the electric motor MOT and the power transmission mechanism TM in the front-rear direction of the vehicle 1. The power conversion device PDU is located between the electric motor MOT and the power transmission mechanism TM and the passenger compartment 4 (see FIG. 1). That is, in the embodiment, the power conversion device PDU is located in front of the electric motor MOT and the power transmission mechanism TM. Therefore, at the time of the rear collision of the vehicle 1, in the drive unit 30, the impact is input to the electric motor MOT and the power transmission mechanism TM located behind the power conversion device PDU. As a result, it is possible to prevent the impact caused by the rear collision of the vehicle 1 from being directly input to the power conversion device PDU.

The power conversion device PDU has a power conversion device case 50. The power conversion device case 50 has a substantially rectangular parallelepiped shape and includes a front surface 50F, a rear surface 50B, a left surface 50L, a right surface 50R, an upper surface 50U, and a lower surface 50D. The power conversion device case 50 is fixed to the electric motor case 40 such that the rear surface 50B of the power conversion device case 50 faces the front surface 40F of the electric motor case 40.

On the right surface 50R of the power conversion device case 50, a DC connector 51 is provided on the upper side and a low voltage connector 52 is provided on the lower side.

The DC line 31 is connected to the DC connector 51 (see FIG. 8) and the power conversion device PDU and the battery BAT are electrically connected via the DC line 31.

A low voltage line 32 is connected to the low voltage connector 52 (see FIG. 8) and power for driving the power conversion device PDU is supplied to the power conversion device PDU. The low voltage line 32 may be connected to the battery BAT or may be connected to a low voltage battery (not illustrated) provided separately from the battery BAT.

Figure 4:
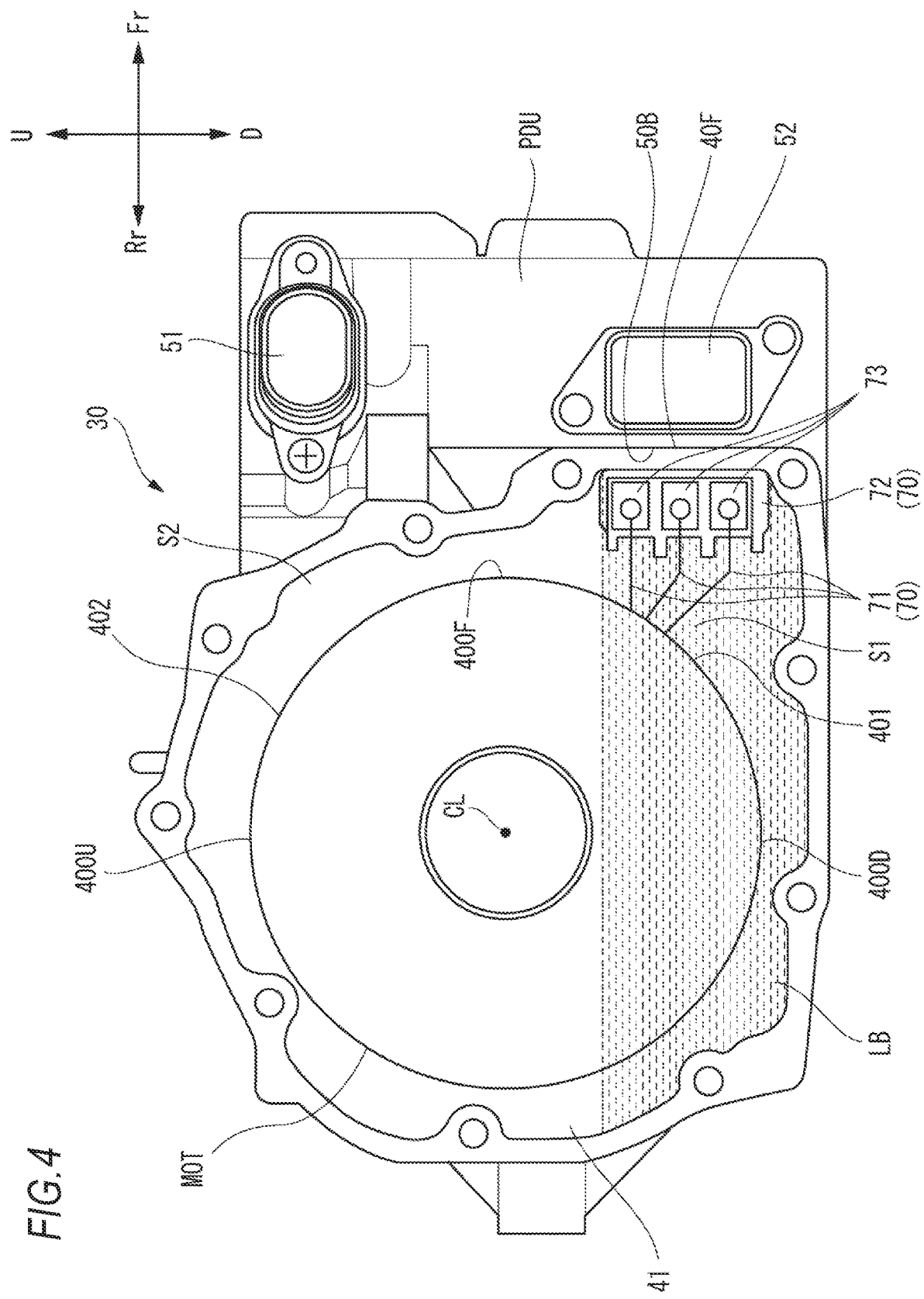
FIG. 4 is a diagram of an electric motor accommodation portion and a power conversion device of the drive unit in FIG. 3 as viewed from the right side.
Figure 5:
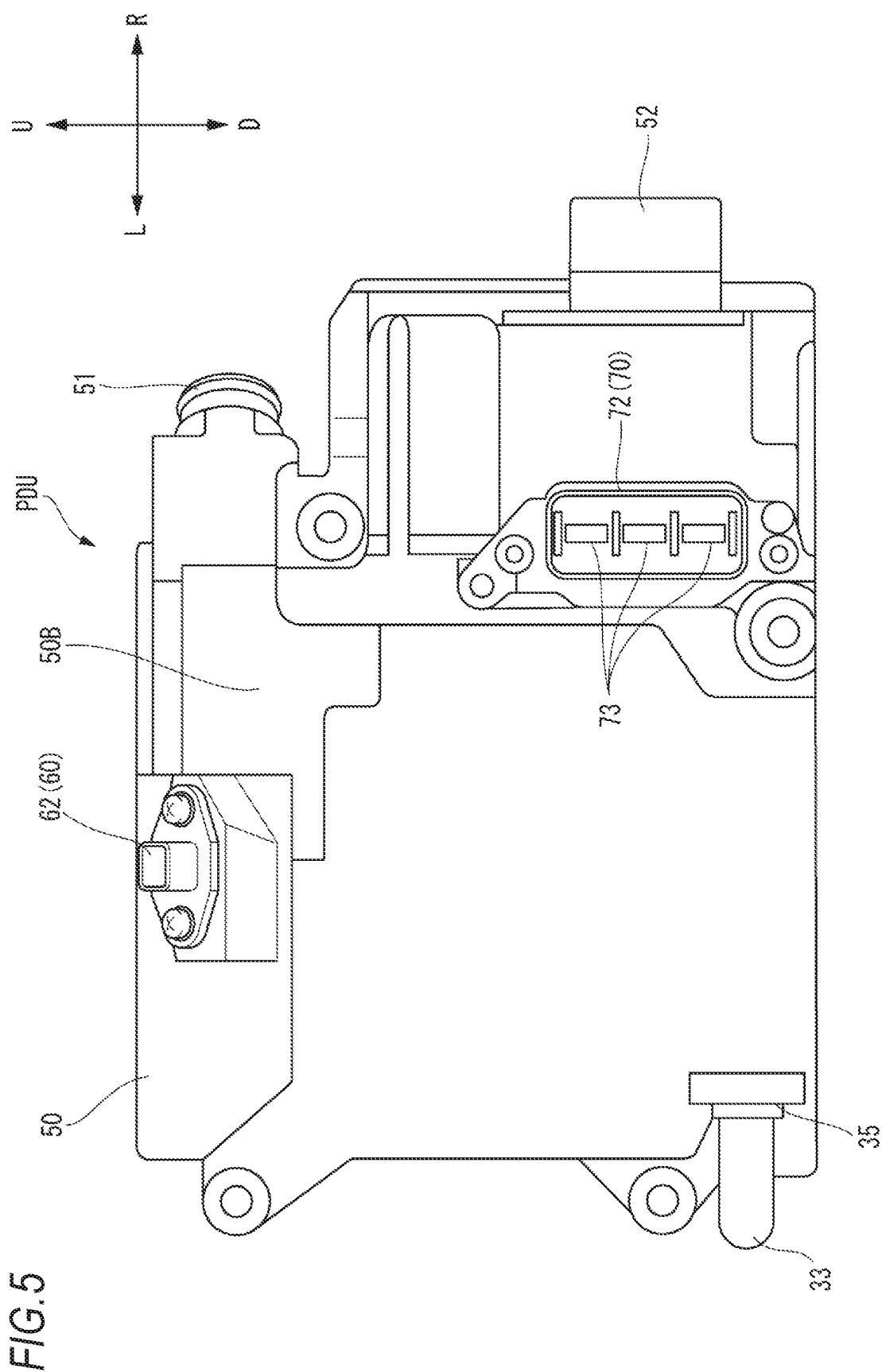
FIG. 5 is a diagram of the power conversion device of the drive unit in FIG. 3 viewed from the rear.

As illustrated in FIGS. 4 and 5, the drive unit 30 includes an electric motor connection unit 70 which electrically connects the electric motor MOT and the power conversion device PDU. To electrically connect the electric motor MOT and the power conversion device PDU means that electric power can be exchanged between the electric motor MOT and the power conversion device PDU. The electric motor connecting portion 70 includes three coil lead wires 71 of U-phase, V-phase, and W-phase extending from the electric motor MOT and a power conversion device side power connector 72 protruding from the rear surface 50B of the power conversion device case 50 into the electric motor accommodation portion 41 of the electric motor case 40. The power conversion device side power connector 72 is provided with terminal portions 73 of three bus bars connected to a substrate of the power conversion device PDU and three coil lead wires 71 are connected to the terminal portions 73 of the three bus bars.

As a result, during power running of the electric motor MOT, the DC power from the battery BAT is converted into AC power by the power conversion device PDU and supplied to the electric motor MOT. During regenerative driving of the electric motor MOT, AC power from the electric motor MOT is converted into DC power by the power conversion device PDU and supplied to the battery BAT.

As illustrated in FIG. 4, the electric motor connection unit 70 is arranged below the rotation axis CL and between the electric motor MOT and the power conversion device PDU in the front-rear direction of the vehicle 1. Accordingly, in the drive unit 30, a space between the electric motor MOT and the power conversion device PDU can be effectively used and the drive unit 30 can be downsized. More specifically, since the electric motor MOT has a substantially cylindrical shape and the power conversion device PDU has a substantially rectangular parallelepiped shape, even when a front end portion 400F of the electric motor MOT is made as close as possible to the power conversion device PDU side when viewed from a rotation axis direction, a space S1 is formed between a front lower cylindrical surface 401 extending from the front end portion 400F of the electric motor MOT to a lower end portion 400D and the rear surface S0B of the power conversion device case 50. By arranging the electric motor connection unit 70 in the space S1, the space S1 can be effectively used and the electric motor MOT can be arranged closer to the power conversion device PDU side. Therefore, it is possible to reduce the dimension in the front-rear direction without increasing the dimension in the up-down direction of the drive unit 30.

Lubricating oil LB is stored in the lower side of the electric motor accommodation portion 41 of the electric motor case 40. At least a part of the coil lead wires 71 of the electric motor connecting portion 70 and the power conversion device side power connector 72 is immersed in the lubricating oil LB stored in the lower side of the electric motor housing portion 41. As a result, the electric motor connecting portion 70 can be cooled by the lubricating oil LB.

As illustrated in FIG. 5, the electric motor connection unit 70 is arranged further on the right side than the center of the power conversion device PDU in the left-right direction.

Figure 6:
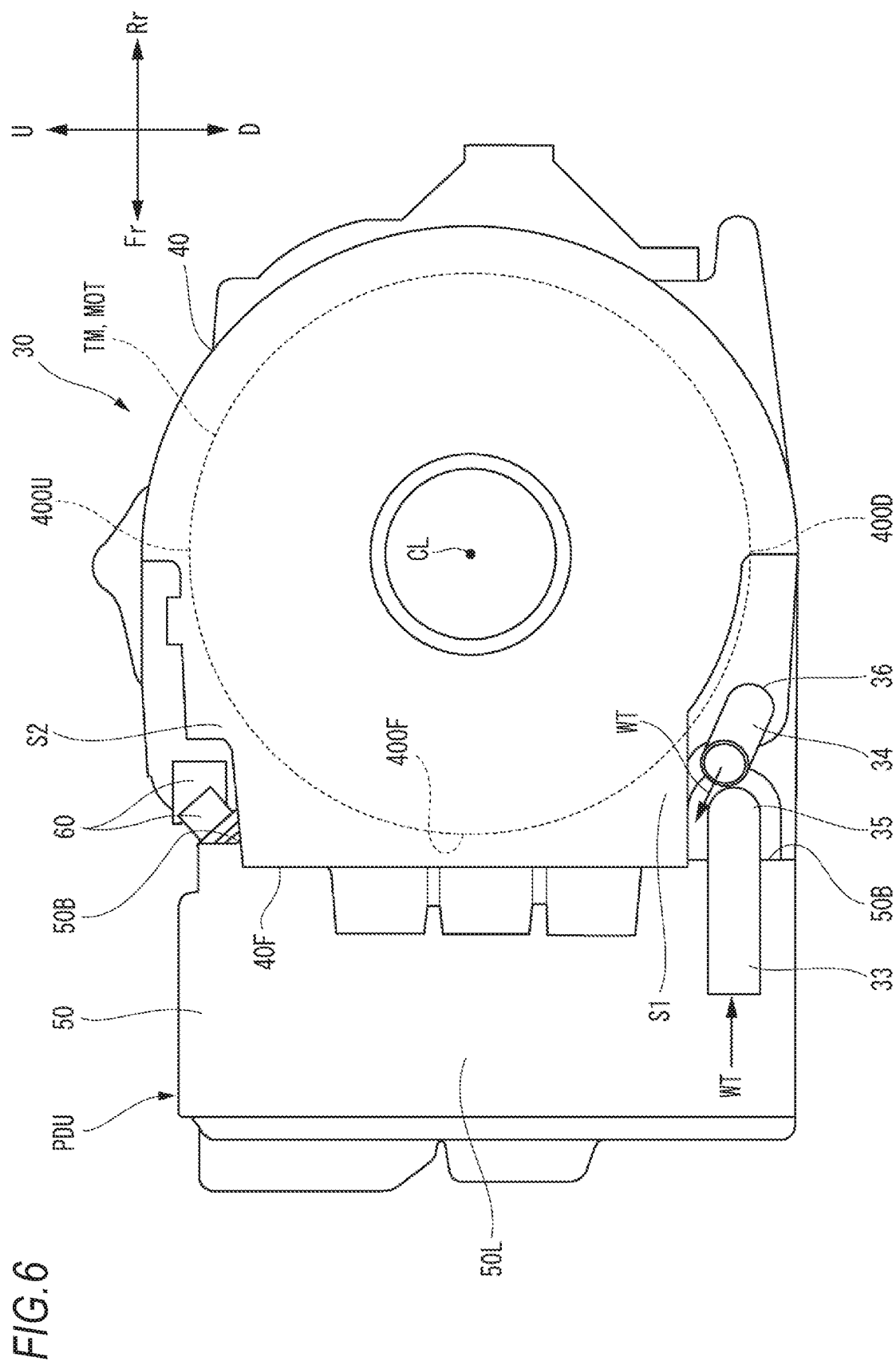
FIG. 6 is a view of the drive unit in FIG. 3 as viewed from the left side.

As illustrated in FIGS. 3 and 6, the drive unit 30 includes a sensor connection unit 60 which electrically connects a sensor provided in the electric motor MOT and the power conversion device PDU. Electrically connecting the sensor and the power conversion device PDU means that a signal from the sensor is connected to the power conversion device PDU so that the signal can be input. The sensor connection unit 60 includes an electric motor side sensor connector 61 provided in the electric motor case 40, a device side sensor connector 62 provided in the power conversion device case 50, and a signal line 63 for electrically connecting the electric motor side sensor connector 61 and the device side sensor connector 62. The electric motor side sensor connector 61 is electrically connected to the sensor (not illustrated) provided in the electric motor MOT. The sensor is not particularly limited as long as it is a sensor which can detect the state of the electric motor MOT, and is, for example, a resolver which detects the rotating state of the electric motor MOT or a thermistor which detects the temperature of the electric motor MOT.

The sensor connection unit 60 is arranged above the rotation axis CL and between the electric motor MOT and the power conversion device PDU in the front-rear direction of the vehicle 1. As a result, in the drive unit 30, the space between the electric motor MOT and the power conversion device PDU can be effectively used, and thus the drive unit 30 can be downsized. More specifically, since the electric motor MOT has a substantially cylindrical shape and the power conversion device PDU has a substantially rectangular parallelepiped shape, even when the front end portion 400F of the electric motor MOT is made as close as possible to the power conversion device PDU side when viewed from the rotation axis direction, a space S2 is formed between a front upper cylindrical surface 402 extending from the front end portion 400F of the electric motor MOT to an upper end portion 400U and the rear surface 50B of the power conversion device case 50. By arranging the sensor connection unit 60 in this space S2, the space S2 can be effectively used and the electric motor MOT can be arranged closer to the power conversion device PDU side. Therefore, it is possible to reduce the dimension in the front-rear direction without increasing the dimension in the up-down direction of the drive unit 30.

The sensor connection unit 60 may be arranged at any position in the left-right direction. In the embodiment, in the left-right direction, the electric motor side sensor connector 61 is arranged near the center of the electric motor case 40 and the device side sensor connector 62 is arranged near the center of the power conversion device case 50. The electric motor side sensor connector 61 and the device side sensor connector 62 are preferably arranged close to each other. It is possible to shorten the signal line 63.

Figure 7:
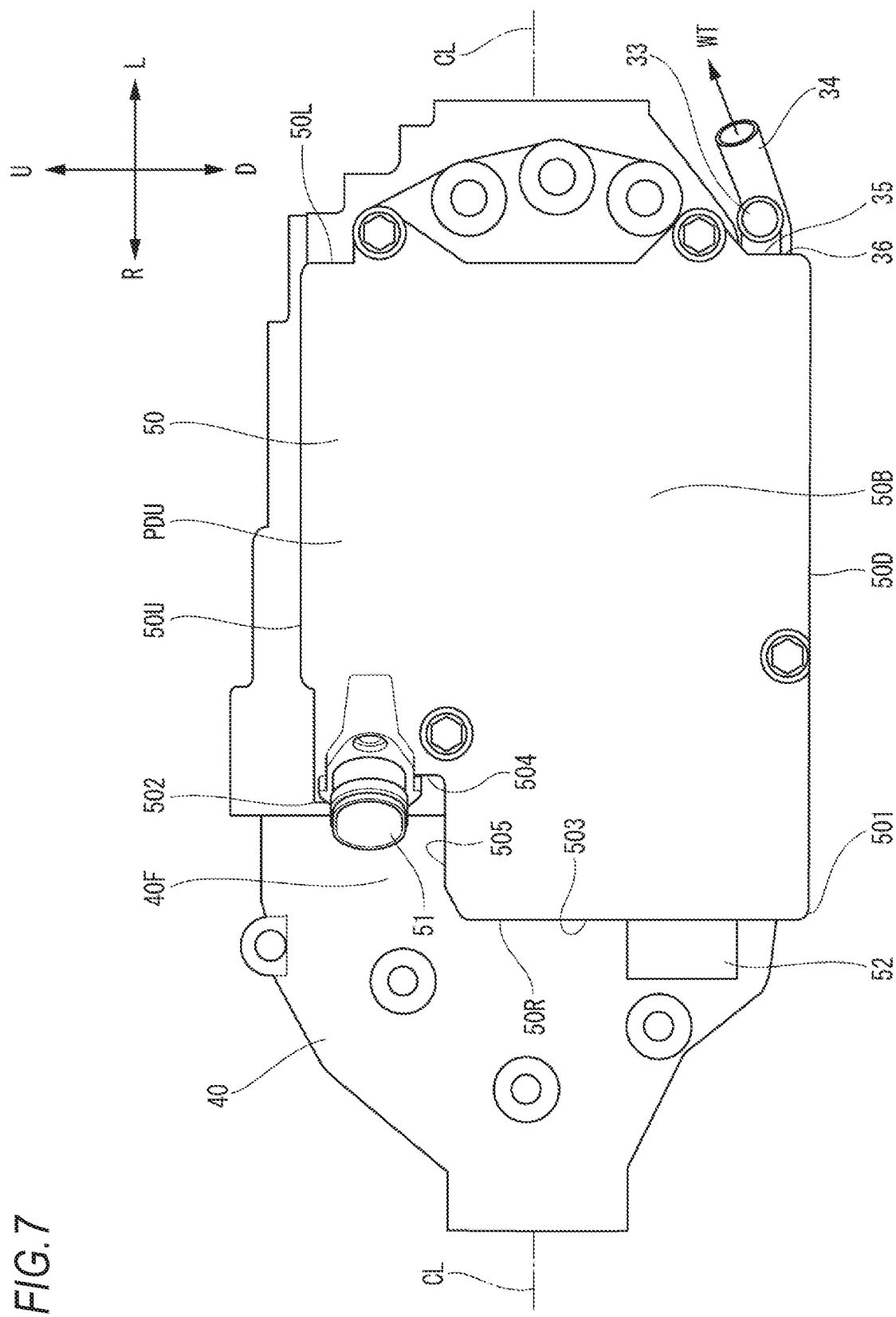
FIG. 7 is a view of the drive unit in FIG. 3 as viewed from the front.

As illustrated in FIGS. 6 and 7, a cooling water introduction pipe 33 and a cooling water discharge pipe 34 are connected to the left side of the drive unit 30 in the left-right direction. Cooling water WT is introduced into the drive unit 30 from the cooling water introduction pipe 33. The cooling water WT introduced from the cooling water introduction pipe 33 circulates inside the drive unit 30 and is discharged from the cooling water discharge pipe 34 to the outside of the drive unit 30. As a result, the drive unit 30 is cooled by the cooling water WI.

The cooling water introduction pipe 33 and the cooling water discharge pipe 34 are connected to a cooling water introduction pipe connecting portion 35 and a cooling water discharge pipe connecting portion 36 of the drive unit 30.

The cooling water introduction pipe connecting portion 35 and the cooling water discharge pipe connecting portion 36 are both arranged on the left side of the drive unit 30. Since the cooling water introduction pipe connecting portion 35 and the cooling water discharge pipe connecting portion 36 are arranged on the same side in the vehicle width direction of the drive unit 30, when the cooling water introduction pipe 33 and the cooling water discharge pipe 34 are connected to the drive unit 30, they can be easily connected. Since the cooling water introduction pipe connecting portion 35 and the cooling water discharge pipe connecting portion 36 are provided on an opposite side of the electric motor connection unit 70 in the rotation axis direction (left-right direction), even when the cooling water WT leaks from the cooling water introduction pipe 33 or the cooling water discharge pipe 34, it is possible to prevent the cooling water WT from being applied to the electric motor connection unit 70.

As illustrated in FIG. 6, the cooling water introduction pipe connecting portion 35 and the cooling water discharge pipe connecting portion 36 are arranged below the rotation axis CL and between the electric motor MOT and the power conversion device PDU in the front-rear direction of the vehicle 1. As a result, in the drive unit 30, the space between the electric motor MOT and the power conversion device PDU can be effectively used, and thus the drive unit 30 can be downsized. More specifically, the electric motor MOT has a substantially cylindrical shape and the power conversion device PDU has a substantially rectangular parallelepiped shape. Therefore, even when the front end portion 400F of the electric motor MOT is made as close as possible to the power conversion device PDU side when viewed from the rotation axis direction, the space S1 is generated between the front lower cylindrical surface 401 extending from the front end portion 400F of the electric motor MOT to the lower end portion 400D and the rear surface SOB of the power conversion device case 50. By arranging the cooling water introduction pipe connecting portion 35 and the cooling water discharge pipe connecting portion 36 in this space S1, the space S1 can be effectively used and the electric motor MOT can be placed closer to the power conversion device PDU side. Therefore, it is possible to reduce the dimension in the front-rear direction without increasing the dimension in the up-down direction of the drive unit 30.

Since the cooling water introduction pipe connecting portion 35 and the cooling water discharge pipe connecting portion are provided below the rotation axis CL in the up-down direction, the traveling wind which flows under the vehicle 1 when the vehicle 1 travels easily hits the cooling water introduction pipe 33 and the cooling water discharge pipe 34, and thus the cooling water WT can be further cooled. Even when the cooling water WT leaks from the cooling water introduction pipe 33 or the cooling water discharge pipe 34, it is possible to prevent the cooling water WT from being applied to the sensor connection unit 60 provided above the rotation axis CL.

The cooling water introduction pipe connecting portion 35 and the cooling water discharge pipe connecting portion 36 are arranged side by side in the front-rear direction of the vehicle 1 such that the cooling water introducing pipe connecting portion 35 is located further on the front side than the cooling water discharge pipe connecting portion 36. The cooling water introduction pipe connecting portion 35 and the cooling water discharge pipe connecting portion 36 are arranged to at least partially overlap each other in the up-down direction.

Since the cooling water introduction pipe connecting portion 35 and the cooling water discharge pipe connecting portion 36 are arranged side by side in the front-rear direction of the vehicle 1, the cooling water introduction pipe 33 and the cooling water discharge pipe 34 can be easily connected by the drive unit 30. Since the cooling water introduction pipe connecting portion 35 is located further on the front side of the vehicle 1 than the cooling water discharge pipe connecting portion 36, the traveling wind when the vehicle 1 travels is more likely to hit the cooling water introduction pipe 33, and thus the cooling water WT introduced into the drive unit 30 can be further cooled. Since the cooling water introduction pipe connecting portion 35 and the cooling water discharge pipe connecting portion 36 are arranged to at least partially overlap each other in the up-down direction, the vertical dimension of the drive unit 30 can be reduced.

In the embodiment, the cooling water introducing pipe connecting portion 35 is provided in the power conversion device case 50 of the drive unit 30 (see FIG. 5) and the cooling water discharging pipe connecting portion 36 is provided in the electric motor case 40 of the drive unit 30. Therefore, it becomes easy to form the cooling water flow path in which the cooling water WT introduced from the cooling water introduction pipe 33 circulates inside the drive unit 30 to flow through the rotating electric machine MOT and the power transmission mechanism TM after flowing through the power conversion device PDU. When the cooling water WT flows through the power conversion device PDU and then the rotating electric machine MOT and the power transmission mechanism TM, in the drive unit 30, the low temperature cooling water WT just introduced from the cooling water introduction pipe 33 can be supplied first to the power conversion device PDU of Which required temperature is lower than that of the rotating electric machine MOT and the power transmission mechanism TM. Therefore, the drive unit 30 can be cooled more efficiently.

As illustrated in FIG. 7, above the lower end portion of the electric motor case 40, the cooling water introduction pipe connecting portion 35 and the cooling water discharge pipe connecting portion 36 are provided so that the cooling water introducing pipe 33 and the cooling water discharge pipe 34 are connected in the rotation axis direction (vehicle width direction) of the electric motor case 40. Therefore, the cooling water introduction pipe 33 and the cooling water discharge pipe 34 extend in the vehicle width direction from the drive unit 30 at the cooling water introduction pipe connecting portion 35 and the cooling water discharge pipe connecting portion 36. Since the cooling water introduction pipe 33 and the cooling water discharge pipe 34 extend in the vehicle width direction of the drive unit 30, the cooling water introduction pipe 33 and the cooling water discharge pipe 34 have a larger area that the traveling wind hits when the vehicle 1 travels. Therefore, the cooling water WT flowing through the cooling water introduction pipe 33 and the cooling water discharge pipe can be cooled. As a result, the more cooled cooling water WT is introduced into the drive unit 30, so that the cooling performance of the drive unit 30 is improved. Since the cooling water introduction pipe connecting portion 35 and the cooling water discharge pipe connecting portion 36 are provided above the lower end portion of the drive unit 30, it is possible to prevent the cooling water introduction pipe connecting portion 35 and the cooling water discharge pipe connecting portion 36, the cooling water introduction pipe 33, and the cooling water discharge pipe 34 from being damaged by an obstacle or the like below the vehicle 1. Since the power conversion device case 50 is arranged to protrudes further downward than the cooling water introduction pipe 33 and the cooling water discharge pipe 34, even when the cooling water WT leaks from the cooling water introduction pipe 33 or the cooling water discharge pipe 34, the power conversion device case 50 functions as a protection wall. Therefore, in the rotation axis direction (left-right direction), it is possible to further prevent the cooling water WI from being applied to the electric motor connection unit 70, the DC connector 51, and the low voltage connector 52, which are provided on the right side opposite to the cooling water introduction pipe 33 or the cooling water discharge pipe 34.

When viewed from the front, the cooling water introduction pipe 33 and the cooling water discharge pipe 34 are exposed in the vehicle width direction than the power conversion device PDU. As a result, the traveling wind which flows from the front to the rear when the vehicle 1 travels is more likely to hit the cooling water introduction pipe 33 and the cooling water discharge pipe 34, and thus the cooling water WT can be further cooled.

In the power conversion device case 50 of the power conversion device PDU, the right upper end portion 502 is located further on the left side than the right lower end portion 501 in the left-right direction when viewed from the front-rear direction. On the right surface 50R of the power conversion device case 50, a right lower side surface 503 extending upward from the right lower end portion 501 of the power conversion device case 50, a right upper side surface 504 which extends downward from the right upper end portion 502 of the power conversion device case 50 and is located further on the left side than the right lower side surface 503 in the left-right direction, and a step surface 505 which connects the upper end portion of the right lower side surface 503 and the lower end portion of the upper right side surface 504 in the left-right direction are provided.

The DC connector 51 is arranged on the right upper side surface 504 and the low voltage connector 52 is arranged on the right lower side surface 503.

The DC connector 51 is located above the rotation axis CL in the up-down direction, below the upper surface of the power conversion device PDU, and further on the left side than the right lower side surface 503 in the left-right direction. Since the DC connector 51 is located above the rotation axis CL, it is possible to prevent the DC connector 51 from being damaged or leaking electricity even when a foreign object enters from below the vehicle 1. Since the DC connector 51 is located below the upper surface of the power conversion device PDU and further on the left side than the right lower side surface 503 in the left-right direction, it is possible to prevent the DC connector 51 from being exposed further to the outside than the power conversion device PDU in the up-down direction and the left-right direction (rotation axis direction). Since the DC connector 51 is located further on the left side than the right lower side surface 503 in the left-right direction, the right lower side surface 503 can be easily viewed from above the drive unit 30 (see FIG. 8), Since the low voltage connector 52 is arranged on the right lower side surface 503 which can be easily visually recognized from above the drive unit 30, the space in the right lower side surface 503 of the power conversion device PDU is effectively used and the maintainability is excellent.

Figure 8:
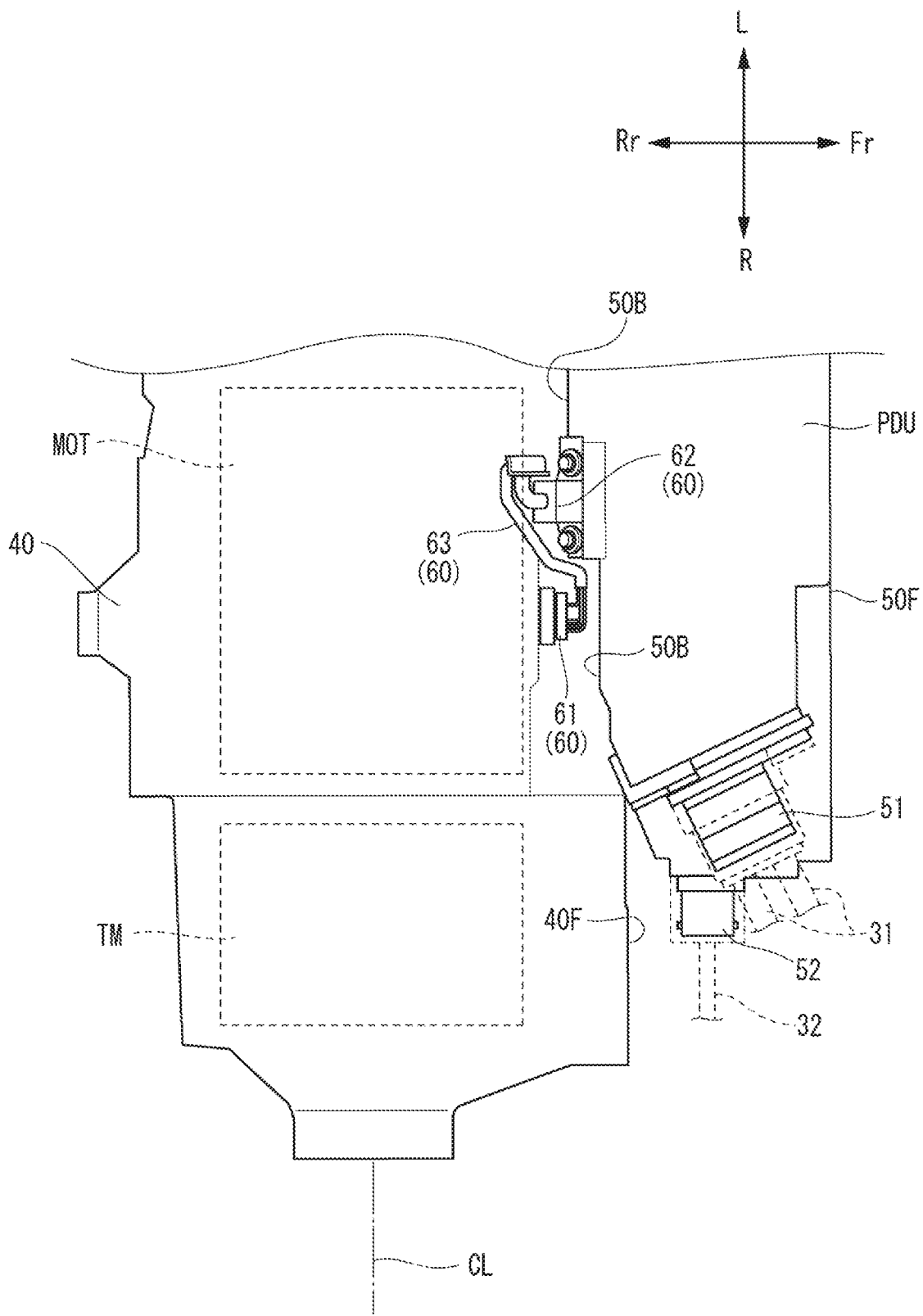
FIG. 8 is an enlarged view of a main part of the drive unit in FIG. 3 as viewed from above.

As illustrated in FIG. 8, the DC connector 51 disposed in the right upper side surface 504 is disposed to protrude obliquely to the front right from the power conversion device PDU when viewed from above. That is, the DC connector 51 is arranged to protrude from the power conversion device PDU at a predetermined angle in a direction away from the electric motor MOT in the front-rear direction as it goes away from the power conversion device PDU in the left-right direction (rotation axis direction). Thereby, when connecting the DC line 31 to the DC connector 51, a large space can be secured between the tip of the DC connector 51 and the electric motor case 40 in the front-rear direction, so that a working space can be easily secured. As a result, maintainability is improved.

The DC connector 51 is arranged further on the rear side than the front end of the power conversion device PDU, that is, on the electric motor MOT side in the front-rear direction. Therefore, the DC connector 51 is prevented from being exposed further to the outside than the power conversion device PDU in the front-rear direction.

The low voltage connector 52 arranged in the right lower side surface 503 is arranged to protrude rightward from the power conversion device PDU when viewed from above. That is, the low voltage connector 52 is arranged to protrude in the left-right direction (rotation axis direction) from the power conversion device PDU.

Therefore, when viewed from above, the DC connector 51 is arranged to protrude obliquely rightward and forward from the power conversion device PDU, whereas the low voltage connector 52 is arranged to protrude rightward from the power conversion device PDU. Therefore, the DC line 31 connected to the DC connector 51 and the low voltage line 32 connected to the low voltage connector 52 can be arranged to be offset in the front-rear direction. As a result, it is possible to prevent the positions of the DC line 31 and the low voltage line 32 from interfering with each other.

Although the embodiment of the invention is described above, the invention is not limited to the embodiment described above and various modifications and improvements can be made as appropriate.

For example, in the embodiment described above, the hybrid vehicle having the engine ENG and the electric motor MOT as the driving source is exemplified, but an electric vehicle having only the electric motor MOT as the driving source may be used.

In the embodiment described above, although the drive unit 30 accommodating the electric motor MOT is arranged in the rear part of the vehicle 1, the drive unit 30 may be arranged in the front room 6 and the electric motor MOT may be used as a drive source for driving the left and right front wheels FW, Here, it is preferable that the power conversion device PDU be arranged to be located between the electric motor MOT and the passenger compartment 4 in the front-rear direction, that is, the power conversion device PDU face rearward.

In the embodiment described above, although the drive unit 30 has the electric motor case 40 and the power conversion device case 50, the electric motor case 40 and the power conversion device case 50 may be one case integrally molded. That is, the electric motor MOT and the power conversion device PDU may be accommodated in one case.

In the embodiment described above, in the drive unit 30, the cooling water WT is introduced from the cooling water introduction pipe 33, circulates inside the drive unit 30, and is discharged from the cooling water discharge pipe 34 to the outside of the drive unit 30. However, it is not limited to the cooling water WT and any cooling liquid may be introduced and circulated inside the drive unit 30.

At least the following matters are described in the specification. Although the components or the likes corresponding to those of the embodiment described above are shown in parentheses, the invention is not limited to this.

(1) The drive unit including
a rotating electric machine (electric motor MOT) having a rotation axis (rotation axis CO extending in a horizontal direction,
a rotating electric machine case (electric motor case 40) including a rotating electric machine accommodation portion (rotating electric machine accommodation portion 41) for accommodating the rotating electric machine, and
a power conversion device (power conversion device PDU) electrically connected to the rotating electric machine and converting electric power supplied to the rotating electric machine and electric power supplied from the rotating electric machine, in which
the power conversion device is arranged on one side of the rotating electric machine in an orthogonal direction (front-rear direction) orthogonal to both the rotation axis direction and an up-down direction,
the power conversion device includes a first end (right surface 50R) and a second end (left surface 50L) in the rotation axis direction, and a first connector (DC connector) to which a first electric power line (DC line 31) through which electric power supplied to the rotating electric machine and electric power supplied from the rotating electric machine flow are connected, and
the first connector is provided on the first end side in the rotation axis direction and is arranged to protrude from the power conversion device at a predetermined angle in a direction (front direction) away from the rotating electric machine in the orthogonal direction as the first connector goes away (rightward) from the power conversion device in the rotation axis direction when viewed from above.

According to (1), when viewed from above, the first connector is arranged to protrude from the power conversion device at the predetermined angle in the direction away from the rotating electric machine in the orthogonal direction as the first connector goes away from the power conversion device in the rotation axis direction. Therefore, it is easy to secure a work space, and thus maintainability is improved.

(2) The drive unit according to (1), in which
the first connector is arranged closer to the rotating electric machine side than an end (front surface 50F) of the power conversion device, which is the end on a side opposite to the rotating electric machine case, in the orthogonal direction.

According to (2), in the orthogonal direction, the first connector is arranged closer to the rotating electric machine side than the end of the power conversion device, which is the end on the side opposite to the rotating electric machine case. Therefore, it is possible to prevent the first connector from being exposed further to the outside than the power conversion device in the orthogonal direction.

(3) The drive unit according to (1) or (2), in which
when viewed from the orthogonal direction,
a lower side surface (right lower side surface 503), an upper side surface (right upper side surface 504) located closer to the second end side than the lower side surface in the rotation axis direction, and a step surface (step surface 505) connecting an upper end of the lower side surface and a lower end of the upper side surface in the rotation axis direction are provided on the first end side of the power conversion device, and the first connector is disposed on the upper side surface, is located below an upper surface of the power conversion device, and is located further on the second end side than the lower side surface in the rotation axis direction.

According to (3), the first connector is arranged on the upper side surface located further on the second end side than the lower side surface in the rotation axis direction and the first connector is located below the upper surface of the power conversion device and closer to the second end side than the lower side surface in the rotation axis direction. Therefore, it is possible to prevent the first connector from being exposed further to the outside than the power conversion device in the rotation axis direction and the up-down direction.

(4) The drive unit according to (3), in which the power conversion device has a second connector (low voltage connector 52) to which a second electric power line (low voltage line 32) for supplying power to the power conversion device is connected, and the second connector is arranged on the lower side surface.

According to (4), the second connector is arranged on the lower side surface that can be easily viewed from above the drive unit. Therefore, a space on the lower side surface of the power conversion device is effectively used, and thus the maintainability is excellent.

(5) The drive unit according to (4), in which the second connector is arranged to protrude from the power conversion device in the rotation axis direction when viewed from above.

According to (5), when viewed from above, the first connector is arranged to protrude from the power conversion device at the predetermined angle in the direction away from the rotating electric machine in the orthogonal direction as it goes away from the upper side surface in the rotation axis direction, whereas the second connector is arranged to protrude from the power conversion device in the rotation axis direction. Therefore, the first electric power line connected to the first connector and the second electric power line connected to the second connector can be arranged to be displaced in the orthogonal direction, and thus it is possible to prevent the positions of the first electric power line and the second electric power line from interfering with each other.

(6) The drive unit according to any one of (1) to (5), in which the drive unit is connected to a cooling liquid introduction pipe (cooling water introduction pipe 33) for introducing a cooling liquid (cooling water WT) to the drive unit and a cooling liquid discharge pipe (cooling water discharge pipe 34) for discharging the cooling liquid from the drive unit, and a cooling liquid introduction pipe connecting portion (cooling water introduction pipe connecting portion 35) to which the cooling liquid introduction pipe connects and a cooling liquid discharge pipe connecting portion (cooling water discharge pipe connecting portion 36) to which the cooling liquid discharge pipe connects are arranged on the second end side in the rotation axis direction.

According to (6), the cooling liquid introduction pipe connecting portion and the cooling liquid discharge pipe connecting portion are provided on the second end side in the rotation axis direction, that is, on the side opposite to the first connector in the rotation axis direction. Therefore, even when the cooling liquid leaks from the cooling liquid introduction pipe or the cooling liquid discharge pipe, it is possible to prevent the cooling liquid from splashing on the first connector.

The invention claimed is:

1. A drive unit comprising:
a rotating electric machine having a rotation axis extending in a horizontal direction;
a rotating electric machine case including a rotating electric machine accommodation portion for accommodating the rotating electric machine; and
a power conversion device electrically connected to the rotating electric machine and configured to convert electric power supplied to the rotating electric machine and electric power supplied from the rotating electric machine, wherein:
the power conversion device is arranged on one side of the rotating electric machine in an orthogonal direction orthogonal to both the rotation axis direction and an up-down direction;
the power conversion device includes a first end and a second end in the rotation axis direction, and a first connector to which a first electric power line through which electric power supplied to the rotating electric machine and electric power supplied from the rotating electric machine flow are connected;
the first connector is provided on a first end side and is arranged to protrude from the power conversion device at a predetermined angle in a direction away from the rotating electric machine in the orthogonal direction, as the first connector goes away from the power conversion device in the rotation axis direction, when viewed from above;
when viewed from the orthogonal direction, a lower side surface, an upper side surface located closer to a second end side than the lower side surface in the rotation axis direction, and a step surface connecting an upper end of the lower side surface and a lower end of the upper side surface in the rotation axis direction are provided on the first end side of the power conversion device; and
when viewed from the orthogonal direction, the first connector is disposed on the upper side surface, is located below an upper surface of the power conversion device, and is located further on the second end side than the lower side surface in the rotation axis direction.

2. The drive unit according to claim 1, wherein
the first connector is arranged closer to a rotating electric machine side than an end of the power conversion device, which is the end on a side opposite to the rotating electric machine case, in the orthogonal direction.

3. The drive unit according to claim 1, wherein:
the power conversion device has a second connector to which a second electric power line for supplying power to the power conversion device is connected; and
the second connector is arranged on the lower side surface.

4. The drive unit according to claim 3, wherein
the second connector is arranged to protrude from the power conversion device in the rotation axis direction when viewed from above.

5. The drive unit according to claim 1, wherein:
the drive unit is connected to a cooling liquid introduction pipe for introducing a cooling liquid to the drive unit and a cooling liquid discharge pipe for discharging the cooling liquid from the drive unit; and a cooling liquid introduction pipe connecting portion to which the cooling liquid introduction pipe connects and a cooling liquid discharge pipe connecting portion to which the cooling liquid discharge pipe connects are arranged on the second end side in the rotation axis direction.

* * * * *